United States Patent
Venkitachalam

[11] Patent Number: 5,458,718
[45] Date of Patent: Oct. 17, 1995

[54] HEAT SEALING METHOD FOR MAKING A LUGGAGE CASE

[75] Inventor: Ramchandra Venkitachalam, Nasik, Ind.

[73] Assignee: VIP Industries Limited, Ind.

[21] Appl. No.: 210,892

[22] Filed: Mar. 18, 1994

[30] Foreign Application Priority Data

Mar. 19, 1993 [EP] European Pat. Off. .............. 93302104

[51] Int. Cl.[6] ................................ B32B 31/26; A45C 3/00
[52] U.S. Cl. ...................... 156/273.9; 156/309.6; 156/379.7; 190/100
[58] Field of Search ............... 156/309.6, 273.9, 156/379.6, 379.7; 190/28, 100; 220/658, 643, 640

[56] References Cited

U.S. PATENT DOCUMENTS

| | | | |
|---|---|---|---|
| 2,758,682 | 8/1956 | Shwayder | 190/28 |
| 2,969,891 | 1/1961 | Presnick . | |
| 3,047,703 | 7/1962 | Aske | 156/379.6 X |
| 3,756,881 | 9/1973 | Denman | 156/273.9 X |
| 4,376,005 | 3/1983 | Vitellaro . | |
| 4,436,988 | 3/1984 | Blumenkranz . | |
| 4,993,585 | 2/1991 | McMahon . | |
| 5,107,098 | 4/1992 | D'Auria . | |
| 5,111,920 | 3/1992 | Castelli et al. . | |

FOREIGN PATENT DOCUMENTS

| | | |
|---|---|---|
| 0019497 | 11/1980 | European Pat. Off. . |
| 0221215 | 5/1987 | European Pat. Off. . |
| 0548750 | 6/1993 | European Pat. Off. . |
| 2156472 | 6/1973 | France . |
| 1284618 | 12/1968 | Germany . |
| 1148044 | 4/1969 | United Kingdom . |
| 1577650 | 10/1980 | United Kingdom . |
| 1592055 | 7/1981 | United Kingdom . |

*Primary Examiner*—Michael W. Ball
*Assistant Examiner*—David W. Reed
*Attorney, Agent, or Firm*—Welsh & Katz, Ltd.

[57] ABSTRACT

A method of joining a beading to a luggage case is provided in which the beading has a conductive material, for example a length of wire embedded within it and in which the beading and the luggage case are positioned together and the conductive material made to pass a current so that it heats up causing the thermoplastic materials to melt locally and fuse. A hard shell luggage case having a thus joined beading and which in a particular embodiment includes a lining which also becomes attached to the case in the method is also provided.

7 Claims, 6 Drawing Sheets

HEAT SEALING METHOD FOR MAKING A LUGGAGE CASE

FIELD OF THE INVENTION

The present invention relates to a heat sealing process. In particular it relates to a heat sealing method of joining a thermoplastic beading, to a luggage case (e.g. a suitcase, briefcase), and also relates to the piece of luggage so formed.

BACKGROUND OF THE INVENTION

In a prior art heat sealing process as shown in U.S. Pat. No. 4,376,005, also known as the EMAWELD process, a thermoplastic matrix loaded with ferromagnetic powder is extruded as a strip and placed between two other plastics surfaces to be fused. The extruded strip is heated by exposing it to a high frequency alternating current and the adjacent plastics surfaces are thus also heated to a temperature at which they fuse with the EMAWELD strip, or with each other. There are disadvantages associated with this method. For example, it is difficult to extrude the plastics when it is loaded with ferromagnetic material, and the whole process is expensive to perform.

It is also known in prior art documents, for example, DE 1,284,618, GB 1,148,044, U.S. Pat. Nos. 5,107,098, 3,047,703 and FR 2,156,472 that a conductive wire can be used in a plastics part so as to fuse the part to a second plastics part by resistance heating. Such a method is used to fuse and seal, e.g. plastics tubes or pipes, motor vehicle fittings, plastics containers or plastics articles.

In certain applications, it would be extremely desirable to be able to seal a plastic strip to another thermoplastics material cheaply and easily. One such application is that of sealing a plastic beading to the hard shell of a suitcase. The plastic beading acts as a water-tight seal to prevent water seeping into the suitcase or as a cushion when the suitcase is closed and the two shells come together. The beading also helps to prevent dust and dirt entering the suitcase.

In more detail, so-called hard side luggage which is typically made of polypropylene or polyethylene often has a plastic beading fitted into grooves around the periphery of the upper and lower shells that make up the suitcase. The plastic beading is made of a soft plastics material, for example, polypropylene, low density polyethylene or ethylvinyl acetate, so that it acts as a cushion. The beading may also be coloured for a pleasing aesthetic effect. Until now, this beading has been attached to the suitcase using adhesives, screws or rivets. This method of fixing is time consuming, labour intensive and therefore expensive. The use of adhesives can give a messy result and screws and rivets tend to look untidy in the finished article. In addition, screws and rivets may cause damage to clothes and can cause injury to the user. They may also become detached from the beading and will then need replacing.

Moulded or hard-side luggage does not usually have an inner lining of cloth or other fabric because there are no frames to conceal the edges of the lining. If a lining is required, a frame will need to be attached for this purpose, with screws or rivets. Again this gives an untidy appearance, and the method of attachment is time-consuming.

SUMMARY OF THE INVENTION

The present invention seeks to provide a method for joining thermoplastics and which can in an exemplary embodiment be used to attach beading to suitcases. The method can also be utilised to attach a lining to a hard shell article of luggage.

In a first aspect the invention provides a method of joining at least two thermoplastic materials wherein at least one of the materials has a conductive material embedded within it which method comprises suitably orienting the thermoplastics materials, and applying a current to the conductive material, whereby localised resistance heating causes the thermoplastic materials to melt locally and to at least partially fuse to join the thermoplastic materials. Preferably the materials become fused when they are cooled, to form a bond.

Preferably the conductive material is wholly embedded in the thermoplastic material, although it may be embedded near to the surface of the thermoplastic material. Preferably the conductive wire is embedded just below the surface, for example, at a distance of around 0.05 mm from the surface. Alternatively, part of the conductive material may be exposed to the exterior of the surface. Preferably the conductive material is embedded near to or exposed at the surface of the thermoplastic material which is intended to be joined to another thermoplastic material.

Preferably the method comprises a first step of extruding a length of a first thermoplastics material together with a length of a conductive material whereby the conductive material is embedded in the thermoplastics material. Typically, the conductive material is a wire, for example a metal wire, and a length of thermoplastics material in the form of a beading may be extruded together with the conductive wire to embed the wire therein. The beading may be L-shaped and the arms of the "L" may be of equal or unequal thickness.

In a specific embodiment the method comprises inserting the beading of thermoplastic material with the embedded length of conductive material into a channel in a hard shell of an article of luggage, and passing a current through the length of conductive material whereby the plastics material of the beading and luggage case shell locally melt and fuse, thereby to attach the beading to the luggage case shell.

Typically, the channel will be a groove in an outwardly projecting rib extending around the periphery of one or both of the hard shells of the article of luggage.

Advantageously the method further includes trapping the edge of a lining between the beading and hard shell, whereby when a current is passed through the conductive material, the edge of the lining also melts and fuses with the beading and/or shell. The remainder of the lining may be fixed, for example by an adhesive, with rivets or screws, or other conventional means, to the inside surface of the hard shell. The lining may be a sheet or woven fabric.

Preferably the trapping of the edge of the lining is carried out by trapping the edge of the lining between a second beading and a second channel of the hard shell. Usually, this second channel will be a second groove in the outwardly projecting rib which extends around the periphery of the hard shell. The second groove will usually be the inner groove, so that the first groove contains the beading which acts as a seal, and the second, inner groove contains the beading which attaches, by trapping, the shell lining.

In a further aspect, the invention provides a hard side luggage case which comprises at least two hard shells, at least one shell having around its periphery which in the closed luggage case abuts the other hard shell a plastic beading, part of which is fused with the periphery of the shell to attach it to the shell.

Preferably the plastic beading sits in and is fused to a channel in a rib which projects outwardly from and extends peripherally around the hard shell of the luggage case. More preferably, the channel is a groove in the rib.

One or both of the hard shells of the luggage case may also have a lining. The edge of the lining may be trapped between and fused to one or both of the beading and the hard shell, to fix the lining to the shell.

Advantageously the remainder of the lining may be fixed, for example by an adhesive, with rivets or screws, or other conventional means, to the inside surface of the hard shell. The advantages of attaching the lining using this heat sealing method are that it gives a neat finish, and edge peeling is avoided.

Typically the hard shell will be formed of polypropylene or polyethylene and the plastic beading will be polypropylene, low density polyethylene, ethylvinyl acetate or some other suitable material. Such a material may be selected for its compatibility in fusing with the material of the shell.

Typically the plastic beading sits in a groove provided in a hard plastic rib which projects outwardly from the periphery of one or both of the shells. The luggage case provided by the present invention may have a beading or lining attached according to any of the methods mentioned above.

BRIEF DESCRIPTION OF THE DRAWINGS

A specific embodiment of the invention will now be described, by way of example only, and with reference to the accompanying drawings in which.

DETAILED DESCRIPTION OF PREFERRED EMBODIMENT

Figure 1:
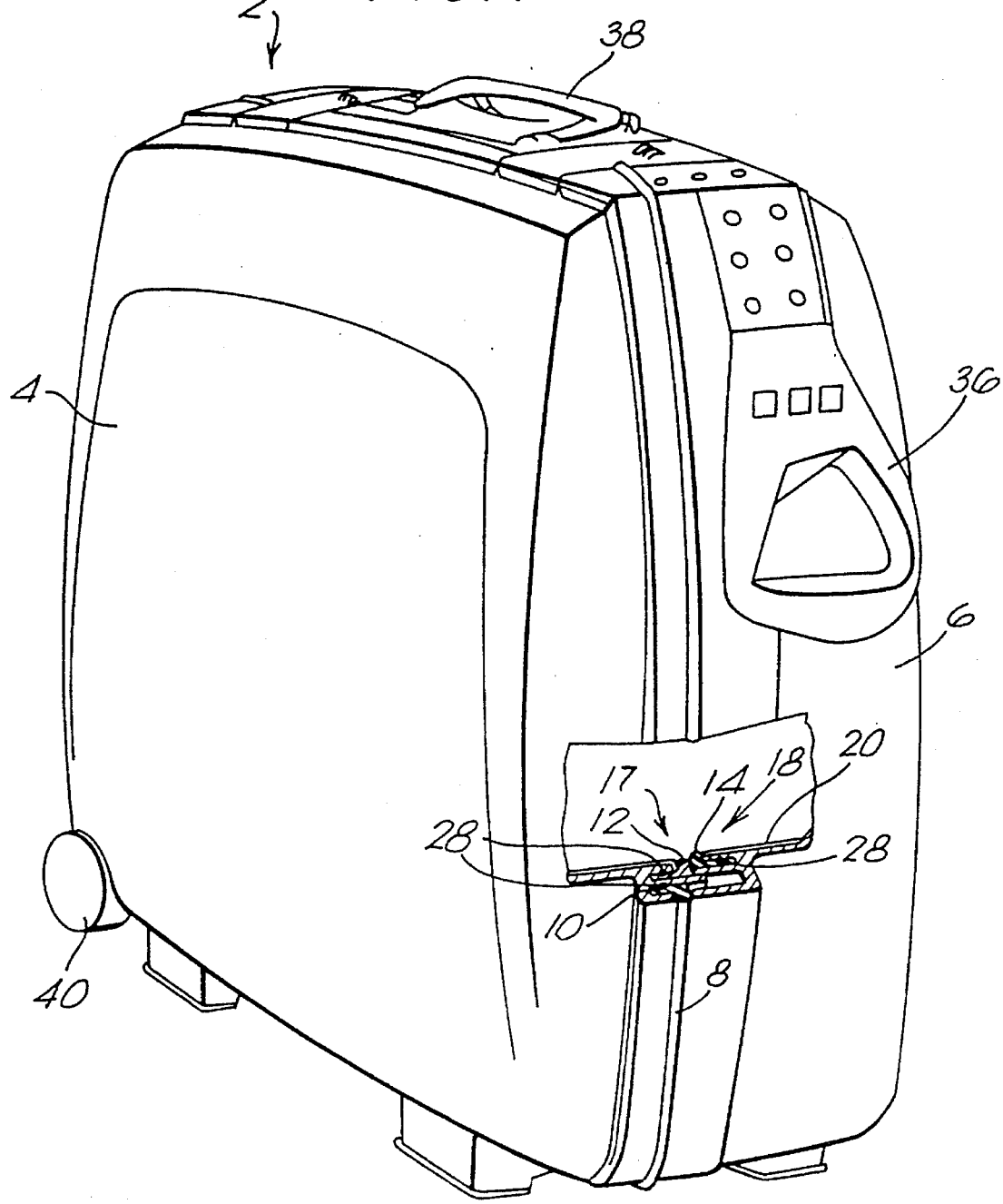
FIG. 1 is a perspective view of a luggage case, in this case a suitcase, exemplifying one aspect of the invention, and showing one part of a side wall in section.
Figure 2:
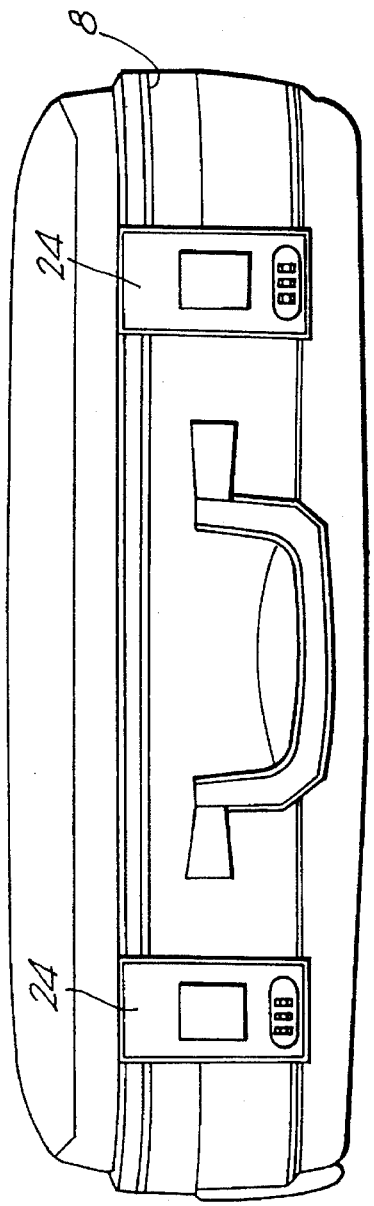
FIG. 2 is a view from above of the suitcase.
Figure 3:
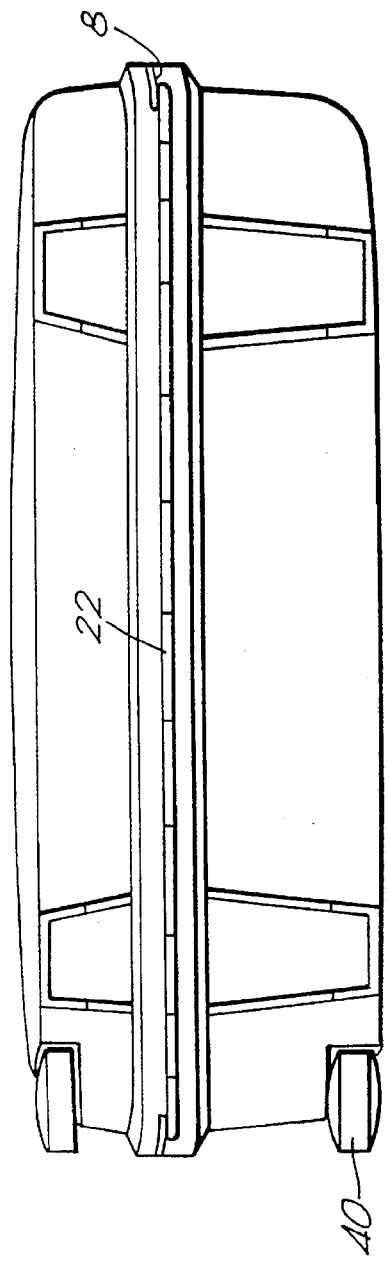
FIG. 3 is a view from below of the suitcase.

In FIG. 1 a hard side suitcase is indicated generally at 2 and which has two shells 4 and 6. A plastic beading 8 is fixed in a channel 10 around the periphery of an outwardly projecting rib 17 the upper shell 4. The other plastic beadings 12 and 14 are fixed in respective channels 16 and 18 in ribs 17 and 19 (see FIG. 6) projecting from the upper and lower shells respectively. A lining 20 is attached to the shell at the beadings 16 and 18 and glued with adhesive to the inner surfaces of the shells 4 and 6. FIGS. 2 and 3 show how the beading 8 extends around the periphery of the suitcase with one discontinuity at the hinge 22.

Figure 4:
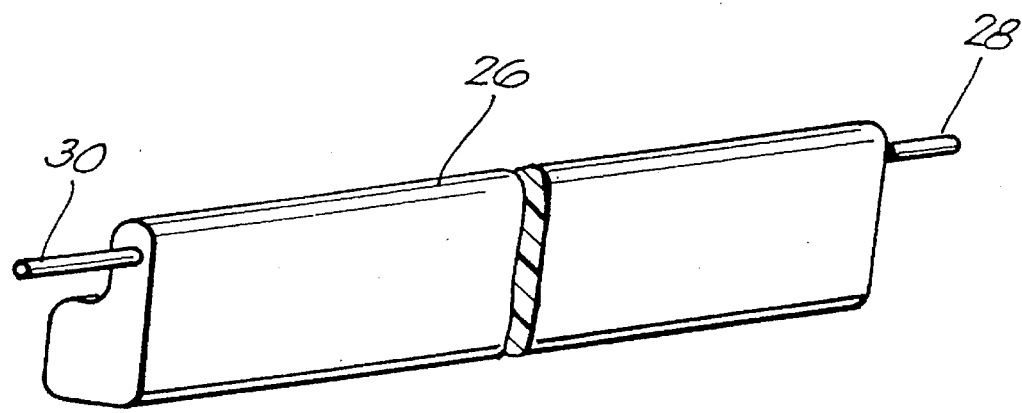
FIG. 4 is a view of a plastic beading with a wire embedded in it.
Figure 5:
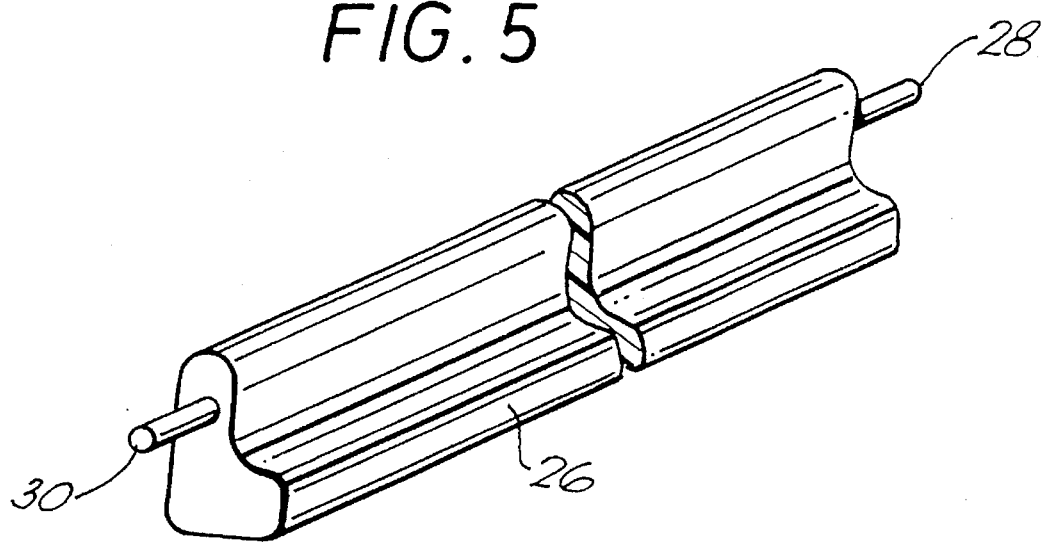
FIG. 5 is a view of the plastic beading of FIG. 4 from an opposing side.

As can be seen more clearly in FIGS. 4 and 5, the beading comprises a length 26 of low density polyethylene with a conductive wire 28 embedded in it. The metal wire is typically of mild steel which may have a resistivity of around $40 \times 10^{-6}$ $\Omega cm^{-1}$. During manufacture, the beading is extruded together with the conductive wire. The beading 8 can be extruded in any chosen shape to fit with the intended groove. In FIGS. 4 and 5 the pre-melted beading can be seen with the conductive metal wire 28 embedded at 0.05 mm from the surface of the beading.

Figure 6:
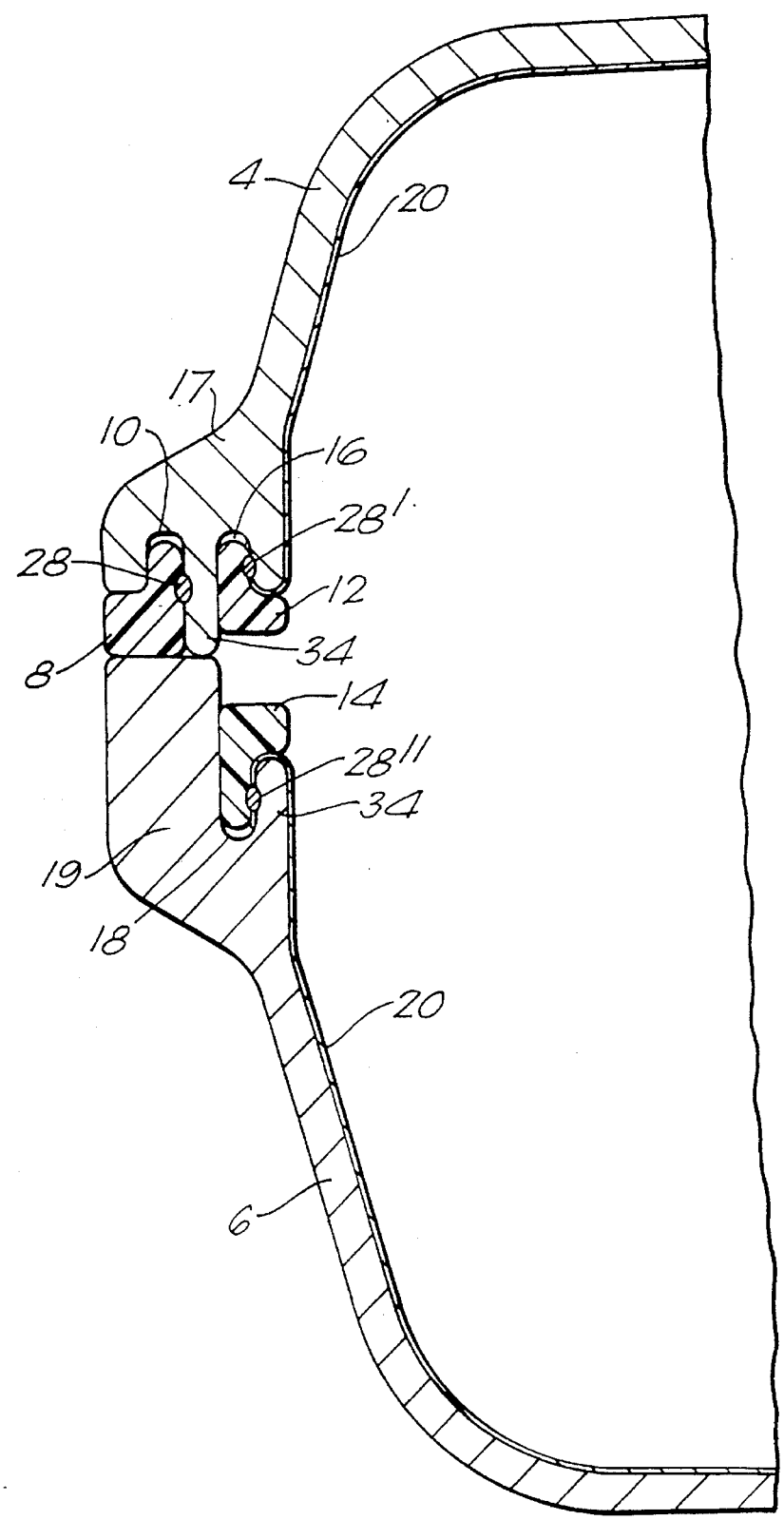
FIG. 6 is a section through part of the suitcase at the point where the upper and lower shells meet when the suitcase is closed.
Figure 7:
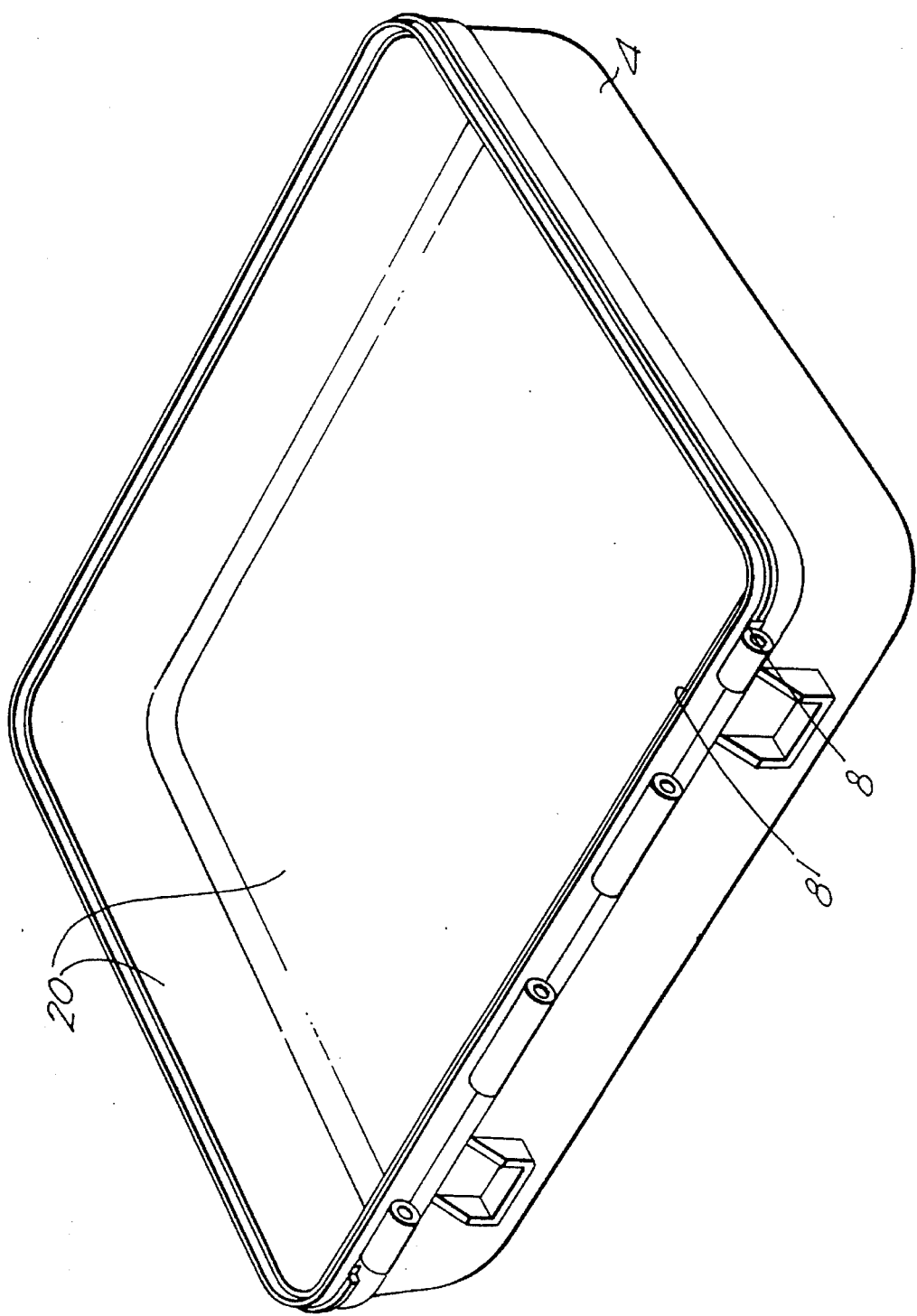
FIG. 7 is a perspective view of the base shell of the suitcase.

In FIG. 6 which is a section through the wall of the suitcase after the beadings 8,12 and 14 have been joined to the shell of the suitcase by resistance heating, reference numeral 28 indicates the area of material of the beading and shell which has melted and fused. The conductive wire (not shown) remains embedded within the fused material.

The three beadings 8, 12 and 14 are each of a shape and configuration to fit the appropriate groove. Generally the beading is L-shaped in cross-section. In beadings 8 and 14 the transverse arm of the L-shape is thicker than the upright arm, but in beading 12 the arms are of generally equal thickness. The conductive wire 28 is located at the surface of one of the arms of the L-shape in the pre-fused beading, in the thinner arm where there is a difference in thickness between the arms.

Beading 8 forms an essentially watertight seal between the upper and lower shells to prevent water seeping into the suitcase. Beadings 12 and 14, as well as providing a cushion for the inner rim of the hard shell attach the edge of lining 20 to the hard shell, as will be described below.

Figure 8:
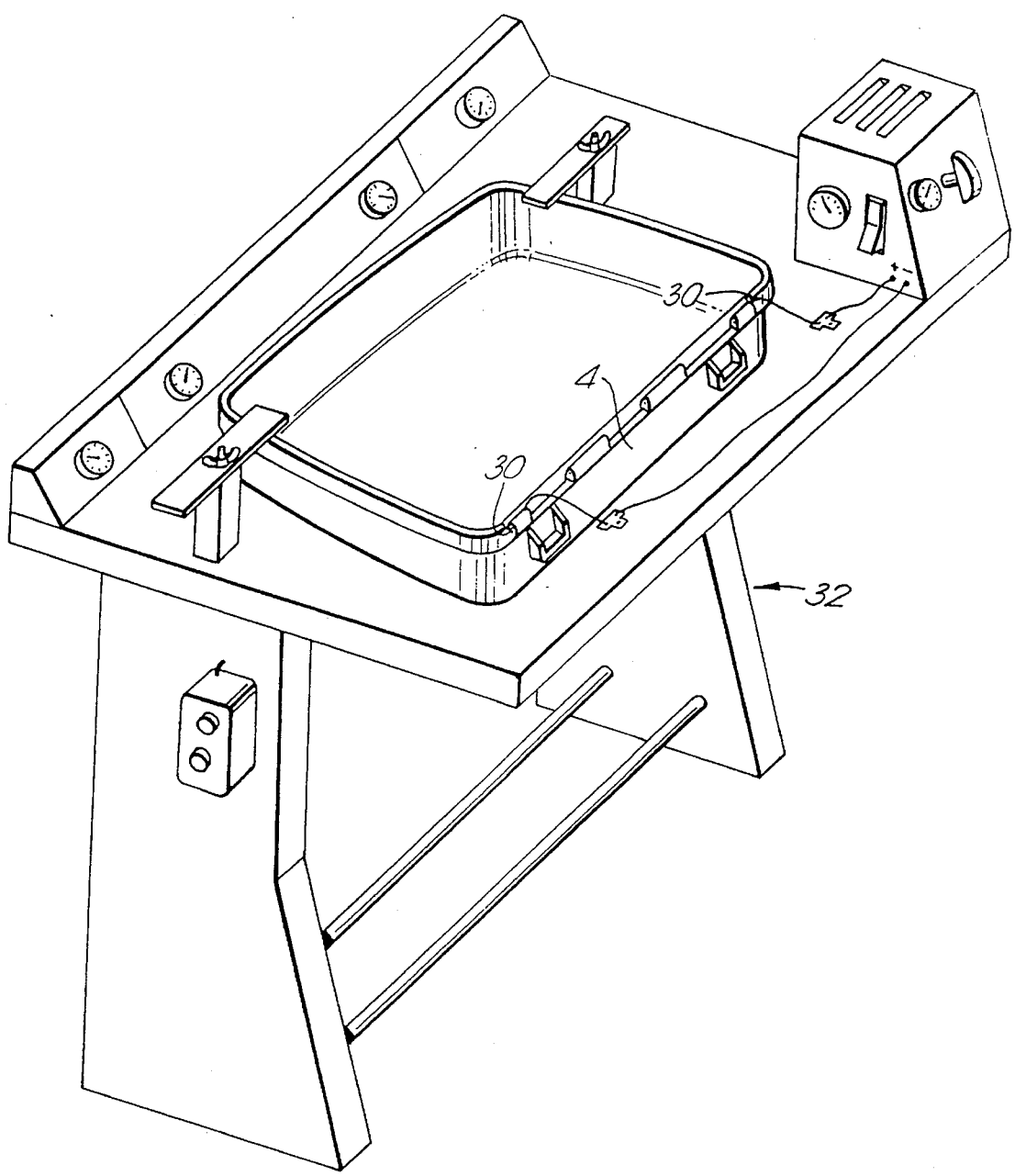
FIG. 8 shows the shell of the suitcase mounted on a machine tool for carrying out a method according to the invention.

To fix the beading 8 to the shell 4, the shell is placed on an apparatus 32 such as that illustrated in FIG. 8 and the beading with the metal wire embedded is inserted into the channel 10. The exposed ends 30 of the metal wire are connected to respective positive and negative electrodes of a power source. When a current is passed through the wire, it heats up due to the resistance to flow of current. The conductive material of the wire can be selected for its resistivity. A typical resistivity of a mild steel wire useful in the invention is $40 \times 10^{-6}$ $\Omega cm^{-1}$. The heat generated causes the thermoplastic material of the beading and of the shell to melt locally and when the material is then allowed to cool the two materials become partly fused. In this way the beading 8 is effectively heat sealed to the shell and a band is formed. The exposed ends of the wire can be cut away close to the rib.

A similar method is used to attach the beadings 12 and 14 to their respective shells, and to attach the edge of the lining. At least the edge of the material of the lining has thermoplastic properties. In the attachment method, the edge of the lining is trapped between the beading 12 or 14 and the shell 4 or 6 when the beading is inserted into the groove 16 or 18. Again the exposed ends 30 of the wire 28 are connected to the power supply and a current passed to heat the wire. This time, as well as the beading and shell (specifically the rib 34) the edge of the lining is heated so that it partially melts and fuses with the plastic of the shell and beading on cooling. Again the exposed ends of the wire can be cut away. In this way the edges of the lining are concealed underneath the beading, and a tidy and aesthetically pleasing appearance results. The fused bond is long-lasting and this method of attaching the lining is easier and cheaper than fixing with screws or rivets. The size of the sheet which forms the lining 20 can be exactly determined so that once the edges have been attached to the shell the remainder of the lining has a very close fit with the shell. The remainder of the lining can be attached to the shell either before or after the edges are fixed, and this may be done using any conventional means such as adhesives, screws or rivets.

Referring to FIGS. 1, 2 and 3 an article of luggage according to the present invention is shown which has a carrying handle 38, locks 24, castor wheels 40. The two shells 4 and 6 are hinged together by hinge 22. A pulling handle 36 is hinged to the shell 6 so that it can extend from the shell in use and can lie flat against the shell at other times.

What is claimed is:

1. A method of attaching a beading to a luggage case shell which comprises:

positioning a thermoplastic beading around the periphery of the said luggage case shell, the periphery of the luggage case shell being thermoplastic and a length of conductive material being embedded in one of said beading and said luggage case shell; and passing a current through the conductive material whereby the material of the thermoplastic beading and luggage case shell melt and fuse locally, to attach the beading to the luggage case shell.

2. A method according to claim 1 which further comprises a first step of extruding a length of said beading together with a length of said conductive material whereby the conductive material is embedded in the beading.

3. A method according to claim 2 wherein the conductive material is a wire.

4. A method according to claim 1 which further includes trapping the edge of a lining between the beading and hard shell, whereby when a current is passed through the wire, the edge of the lining also melts and fuses with the beading and/or shell.

5. A method according to claim 4 which further comprises fixing the remainder of the lining to the inside of the hard shell.

6. The method of claim 1 wherein said luggage case shell forms a periphery, said periphery defining a groove extending around said periphery, said orienting step including attaching said beading in said groove.

7. The method of claim 6 wherein said periphery includes an outwardly projecting rim, said groove being defined in said rim.

* * * * *